(12) United States Patent
Sasaki

(10) Patent No.: US 8,848,256 B2
(45) Date of Patent: Sep. 30, 2014

(54) PRINTING APPARATUS ACQUIRING COLOR CORRECTION DATA BEFORE ENTERING A POWER SAVING MODE

(75) Inventor: Tatsunori Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/421,765

(22) Filed: Mar. 15, 2012

(65) Prior Publication Data
US 2012/0257224 A1 Oct. 11, 2012

(30) Foreign Application Priority Data
Apr. 8, 2011 (JP) ................................. 2011-086749

(51) Int. Cl.
| | |
|---|---|
| H04N 1/00 | (2006.01) |
| H04N 1/60 | (2006.01) |
| G06K 15/02 | (2006.01) |
| G06F 1/32 | (2006.01) |
| G06F 3/12 | (2006.01) |
| H04N 1/23 | (2006.01) |

(52) U.S. Cl.
CPC .......... *G06F 3/1221* (2013.01); *H04N 1/00045* (2013.01); *H04N 1/0005* (2013.01); *H04N 1/2323* (2013.01); *G06F 3/1229* (2013.01); *G06F 3/1219* (2013.01); *H04N 1/6097* (2013.01); *H04N 1/00079* (2013.01); *H04N 1/00204* (2013.01); *H04N 1/00031* (2013.01); *H04N 1/00087* (2013.01); *H04N 1/00896* (2013.01); *H04N 1/00904* (2013.01); *G06F 3/1232* (2013.01); *G06F 3/1279* (2013.01); *H04N 1/0009* (2013.01); *H04N 2201/0039* (2013.01); *H04N 1/00061* (2013.01); *H04N 1/2338* (2013.01); *G06F 3/1208* (2013.01); *G06F 3/1285* (2013.01); *H04N 1/233* (2013.01); *H04N 2201/0094* (2013.01); *Y02B 60/1271* (2013.01); *H04N 1/00023* (2013.01); *H04N 1/00015* (2013.01)
USPC .......... 358/3.24; 358/1.13; 358/1.14; 358/518

(58) Field of Classification Search
None
See application file for complete search history.

(56) References Cited

U.S. PATENT DOCUMENTS

| | | | |
|---|---|---|---|
| 5,282,046 A | 1/1994 | Yamaguchi | |
| 6,351,320 B1 | 2/2002 | Shin | |

(Continued)

FOREIGN PATENT DOCUMENTS

| | | |
|---|---|---|
| JP | 2003-345572 A | 12/2003 |
| JP | 2010-245684 A | 10/2010 |

OTHER PUBLICATIONS

U.S. Appl. No. 13/436,365, filed Mar. 30, 2012. Applicant: Tatsunori Sasaki.

(Continued)

*Primary Examiner* — Scott A Rogers
(74) *Attorney, Agent, or Firm* — Fitzpatrick, Cella, Harper & Scinto

(57) ABSTRACT

A printing apparatus receives information indicating a type of printing medium from an information processing apparatus, and determines whether data for performing color correction corresponding to the type of printing medium indicated by the information is stored. If it is determined that the data is stored, the printing apparatus transmits the data from a sub-board to the information processing apparatus, receives image data to undergo color correction from the information processing apparatus, and prints an image based on the image data on a main board. The printing apparatus shifts to the power saving mode by restricting power supply to the main board, and returns from the power saving mode upon receiving image data to undergo color correction from the information processing apparatus.

16 Claims, 6 Drawing Sheets

(56) References Cited

U.S. PATENT DOCUMENTS

| | | | |
|---|---|---|---|
| 6,473,197 B1 | 10/2002 | Shimazaki | |
| 6,995,855 B2 | 2/2006 | Nagasaka | |
| 7,145,677 B2 | 12/2006 | Shimbori et al. | |
| 8,213,026 B2* | 7/2012 | Sugiyama | 358/1.15 |
| 8,474,942 B2 | 7/2013 | Kawai | |
| 8,543,855 B2* | 9/2013 | Moloney | 713/323 |
| 8,570,541 B2* | 10/2013 | Nakamura | 358/1.13 |
| 8,629,992 B2 | 1/2014 | Kawaura | |
| 8,713,341 B2* | 4/2014 | Utoh | 713/324 |
| 2005/0088710 A1 | 4/2005 | Nakayama | |
| 2007/0019258 A1 | 1/2007 | Hattori | |
| 2008/0180715 A1 | 7/2008 | Kawaura | |
| 2009/0016749 A1 | 1/2009 | Mashiba | |
| 2010/0235500 A1 | 9/2010 | Shizuno | |
| 2010/0262691 A1 | 10/2010 | Shouno | |
| 2012/0002220 A1* | 1/2012 | Zhan | 358/1.13 |
| 2012/0030491 A1* | 2/2012 | Itou | 713/323 |
| 2012/0081768 A1 | 4/2012 | Iguchi et al. | |
| 2012/0257224 A1 | 10/2012 | Sasaki | |
| 2012/0257258 A1* | 10/2012 | Sasaki | 358/3.24 |
| 2013/0265604 A1* | 10/2013 | Yokoyama | 358/1.14 |
| 2013/0278958 A1* | 10/2013 | Kuwahara | 358/1.13 |
| 2014/0036293 A1* | 2/2014 | Cheng | 358/1.13 |
| 2014/0118779 A1* | 5/2014 | Ito | 358/1.15 |

OTHER PUBLICATIONS

U.S. Appl. No. 13/357,583, filed Jan. 24, 2012. Applicant: Tatsunori Sasaki.

* cited by examiner

PRINTING APPARATUS ACQUIRING COLOR CORRECTION DATA BEFORE ENTERING A POWER SAVING MODE

BACKGROUND OF THE INVENTION

1. Field of the Invention

The present invention relates to a printing apparatus which prints an image based on image data having undergone color correction processing.

2. Description of the Related Art

It has conventionally been known that the density and tint in color reproduction by a color printing apparatus are greatly affected by the individual characteristics of each printing apparatus, use conditions such as room temperature and the elapsed time, the type of paper serving as a printing medium, and the like. For this reason, the printing apparatus outputs test pattern data of a reference color onto a printing medium for use before outputting an actual image. Then, image data undergoes color correction based on color correction data which is the result of measuring the color of the output test pattern using a colorimeter. More specifically, color correction data read by the colorimeter is transmitted to a host apparatus (for example, PC) serving as an image output source. The host apparatus calculates a color correction parameter based on a comparison difference from an ideal value using a multi-dimensional lookup table. The host apparatus executes color correction for actual output image data using the calculated color correction parameter so that an output color in the printing apparatus coincides with a display color in the host apparatus. Then, the host apparatus transmits the actual output image data to the printing apparatus, and the printing apparatus outputs it, implementing color reproduction in output.

However, executing a series of operations for color correction in every image output which places importance on color reproduction wastes consumables, of which the type varies depending on the image forming method, such as ink for an inkjet method or toner for an electrophotographic method. Further, output and color measurement of a test pattern take a predetermined time, decreasing the use efficiency of the whole printing apparatus. To solve these problems, color correction data is stored in the printing apparatus together with time information. The same color correction data is used until the lapse of a predetermined time, a change of the use condition such as a change of room temperature, a change of the paper type, or the like. There is also proposed a print system in which color correction data is stored not in a printing apparatus but in a host apparatus which has output the color correction data (Japanese Patent Laid-Open No. 2003-345572).

In Japanese Patent Laid-Open No. 2003-345572, the printing apparatus stores information for specifying a host apparatus which has acquired color correction data. When another host apparatus requests color correction, the color correction data is acquired using the host specifying information from the host apparatus which exists on the same line and stores the color correction data. This technique can omit a series of operations for color correction, and implement color correction even in a host-based driven printing apparatus having a small storage area.

Recently, concern for the environment has led to a more prominent tendency to save energy. Popular printing apparatuses shift to a power saving state when they stand still for a predetermined time or more. Power is saved by, for example, stopping power to functional blocks except for the minimum number necessary to return to a normal operation state in response to only reception of data or a user operation. To hold the power saving state as long as possible, there is proposed even a printing apparatus in which a communication control unit singly responds to, for example, a periodical inquiry about the printing apparatus state from an application such as a status monitor in the host apparatus without returning the printing apparatus from the power saving state.

However, in the conventional technique, even when usable color correction data is stored in the printing apparatus, the printing apparatus needs to return from the power saving state upon receiving a color correction data acquisition request from the host apparatus. The printing apparatus needs to wait in the normal operation state and wastefully consumes power until the completion of transmitting color correction data to the host apparatus, and calculating a color correction parameter and performing color correction processing for output image data in the host apparatus.

Even if the host apparatus is configured to store color correction data, the printing apparatus stores host specifying information and thus needs to return to the normal operation state. In addition, the host apparatus which stores the color correction data needs to be active, too. In an environment where a plurality of printing apparatuses are connected to a plurality of host apparatuses, like a network interface, color correction data need to be stored by the number of printing apparatuses for respective paper types, increasing the data amount stored in the host apparatuses. When a plurality of host apparatuses store color correction data for respective paper types, they need to be active, and the whole print system enormously consumes power. It is therefore desirable to store color correction data in the printing apparatus.

SUMMARY OF THE INVENTION

An aspect of the present invention is to eliminate the above-mentioned problems with the conventional technology. The present invention provides a printing apparatus and printing method for reducing power consumption in print processing in which image data undergoes color correction, and a storage medium storing a program.

The present invention in its first aspect provides a printing apparatus which operates in a normal power mode and a power saving mode, comprising: a power supply unit; a first control unit configured to include a communication unit for communicating with an external apparatus and receive power supply from the power supply unit in the normal power mode and the power saving mode; and a second control unit configured to include an acquisition unit for acquiring color correction data and a transfer unit for transferring, to the first control unit, color correction data corresponding to a type of printing medium set in the printing apparatus before stopping power supply from the power supply unit in order to shift the printing apparatus from the normal power mode to the power saving mode.

The present invention can reduce power consumption in print processing in which image data undergoes color correction.

Further features of the present invention will become apparent from the following description of exemplary embodiments with reference to the attached drawings.

DESCRIPTION OF THE EMBODIMENTS

Figure 1:
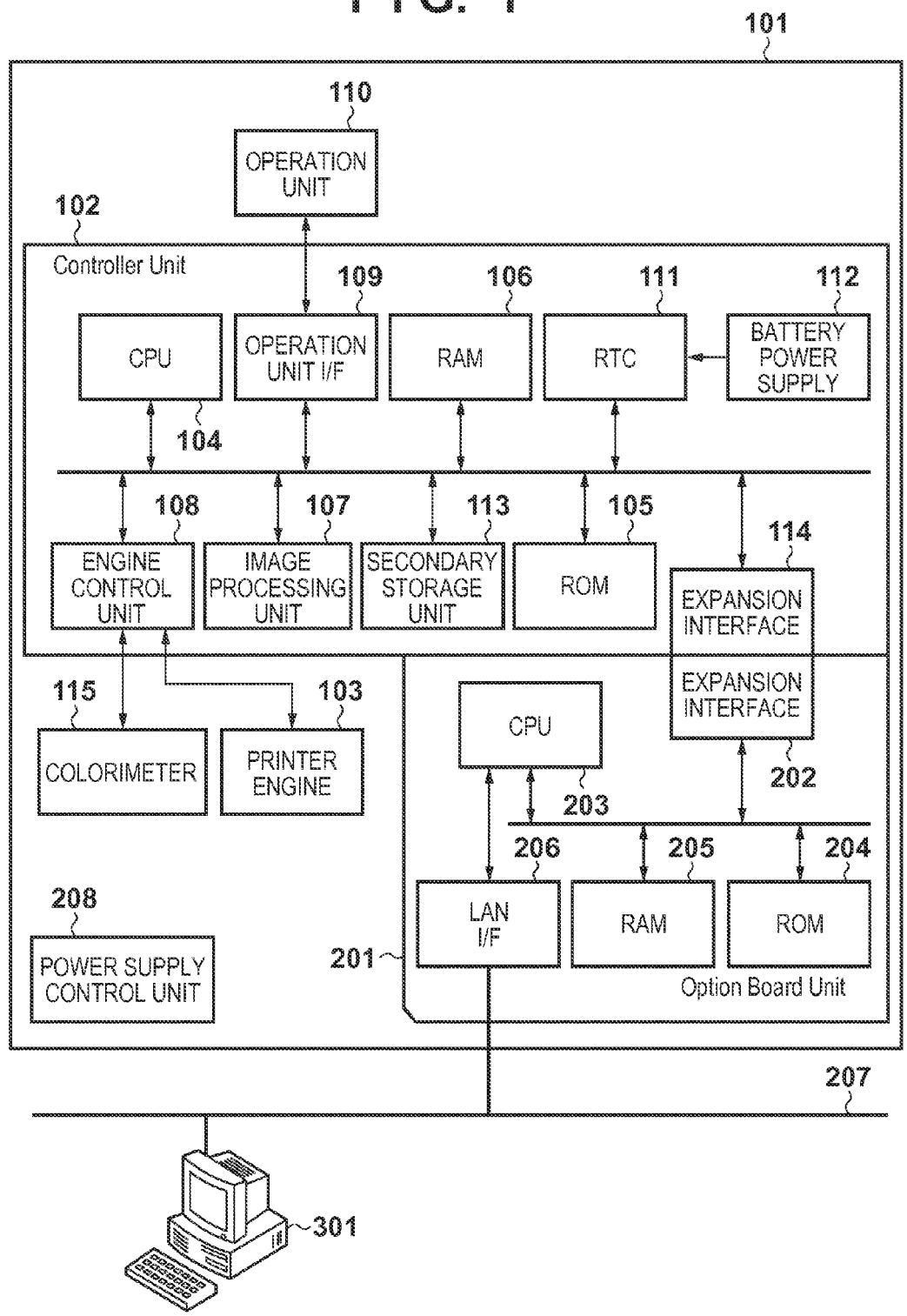
FIG. 1 is a block diagram showing the arrangement of a print system including a printing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

Figure 2:
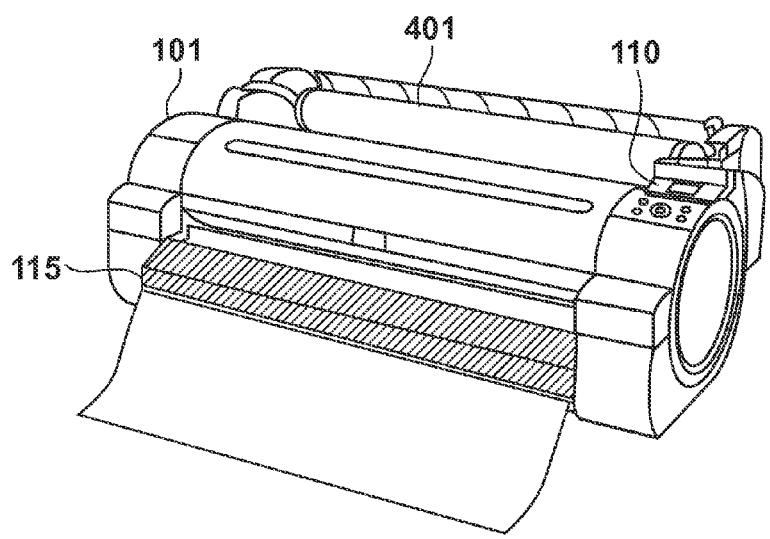
FIG. 2 is a perspective view showing the outer appearance of the printing apparatus.

FIG. 1 is a block diagram showing the arrangement of a printing apparatus according to the first embodiment of the present invention. FIG. 2 is a perspective view showing the outer appearance of a printing apparatus 101 in the embodiment. In the embodiment, a color printer using an inkjet printing method will be exemplified as the printing apparatus 101.

A controller unit 102 serving as the main board of the printing apparatus 101 is connected to a printer engine 103 and color measurement unit (colorimeter) 115. A CPU 104 controls the whole printing apparatus 101 based on a system control program. A ROM 105 stores the system control program serving as a control program for the whole printing apparatus 101. A RAM 106 is a data readable/writable RAM, and the system control program in the ROM 105 is expanded and stored in the RAM 106. The RAM 106 is used even as a buffer memory for storing data before and after image processing by an image processing unit 107. The image processing unit 107 performs color space processing, gamma correction processing, quantization processing based on an error diffusion method, and the like for image data saved in the RAM 106 in accordance with an instruction from the CPU 104, and generates binary data which can be output from the printer engine 103. An engine control unit 108 controls the printer engine 103, and transfers image data processed by the image processing unit 107 to the printer engine 103. The engine control unit 108 includes a connection interface with the color measurement unit (colorimeter) 115. The engine control unit 108 controls the operation of the color measurement unit 115, receives color correction data from the color measurement unit 115, and transfers data to the RAM 106.

The printer engine 103 includes a printhead for forming an image by discharging ink onto a printing medium, a paper conveyance motor for conveying paper serving as a printing medium, and a carriage motor for scanning the printhead in a direction perpendicular to the paper conveyance direction (none are shown). In the embodiment, roll paper is used as paper serving as a printing medium, and conveyed to the color measurement unit 115 after image formation by the printer engine 103. The printer engine 103 includes various error detection sensors and the like (not shown), and operates them under the control of the engine control unit 108. The engine control unit 108 drives the printhead, paper conveyance motor, and carriage motor in synchronism with each other, and fixes ink discharged from the printhead at a desired position on paper, forming a desired image on the paper.

The color measurement unit 115 includes a color measurement sensor, and a driving motor for scanning the color measurement sensor in a direction perpendicular to the paper conveyance direction (none are shown). The color measurement unit 115 measures the color of a test pattern output using the printer engine 103, and generates color correction data. The CPU 104 stores the color correction data in a secondary storage unit 113. Note that paper conveyance when performing color measurement by the color measurement unit 115 uses the paper conveyance motor of the printer engine 103, and is executed under the control of the engine control unit 108.

An operation unit I/F 109 is an interface with an operation unit 110, and outputs, to the display unit of the operation unit 110, image data which is stored in the ROM 105, is rasterized in the RAM 106, and is to be displayed on the operation unit 110. The operation unit I/F 109 notifies the CPU 104 of information input by the user using the input function of the operation unit 110. The operation unit 110 has an input function of inputting settings from the user to the printing apparatus 101, and a display function of displaying a notification from the printing apparatus 101 to the user. The operation unit 110 is used to present information to the user and input an instruction. In the embodiment, when setting paper used for output in the printing apparatus 101, the user selects and registers the type and size of set paper via the operation unit 110.

A real-time clock (RTC) 111 has a timepiece function, and measures and stores date & time information necessary for the printing apparatus 101. The RTC 111 is connected to a battery power supply 112 parallel to a power supply used inside the apparatus. Even when power supply to the controller unit 102 is restricted (or stopped) in the power off state or power saving state (power saving mode) of the printing apparatus 101, the battery power supply 112 allows continuing the operation of the RTC 111 to prevent measurement stop or erase of date & time information. The secondary storage unit 113 is connected to a nonvolatile hard disk drive (HDD) using a magnetic recording method. In the embodiment, the secondary storage unit 113 has two areas. One is a user data storage area which stores image data in accordance with user designation and can output an image in accordance with image data designation using the operation unit 110 without using a host apparatus 301. The other is a system area which stores the processing parameters of the printing apparatus 101 and the like. In the embodiment, color correction data is stored in the system area of the secondary storage unit 113 in correspondence with a set of information about a paper type used in color measurement, and information about the date & time when color measurement was executed that is acquired from the RTC 111.

An expansion interface 114 can connect an option board unit 201 (sub-board) for expanding functions of the printing apparatus 101. In the embodiment, the option board unit 201 is connected via the expansion interface 114 of the controller unit 102 and an expansion interface 202. The option board unit 201 includes a CPU 203, ROM 204, RAM 205, and LAN interface 206. The option board unit 201 is connected via a LAN 207 to the host apparatus 301 serving as an information processing apparatus. The option board unit 201 receives job data and transmits status information of the printing apparatus 101. Note that the LAN 207 and LAN interface 206 are configured according to, for example, the Ethernet® interface standard. The CPU 203 incorporates the controller unit of the LAN interface 206, and controls communication with the host apparatus 301 via the LAN 207. The ROM 204 stores the control program of the option board unit 201. The RAM 205 is a data readable/writable RAM, and is used to expand a program in the ROM 204 and execute the control program of the option board unit 201. The RAM 205 is used even as a buffer memory when receiving job data. The RAM 205 is also used as a memory for storing status information to be sent back in response to a periodical inquiry in the power saving state from an application such as a status monitor in the host apparatus 301 without returning to the normal operation state (normal power mode).

The host apparatus 301 is a general PC, and is connected to the LAN 207. Driver software which sets and manages printing of the printing apparatus 101 runs on the host apparatus 301. The driver software executes color space conversion and gamma correction processing regarding color reproduction of an output image. The driver software executes even creation of test pattern data, reception of color correction data, and calculation of parameter values from the received color correction data to replace table values in color space conversion, gamma correction, and the like in the embodiment. Even an application program such as the status monitor runs, and issues a periodical inquiry via the LAN 207 to confirm the state of the printing apparatus 101 and the remaining amount of consumables.

Figure 3:
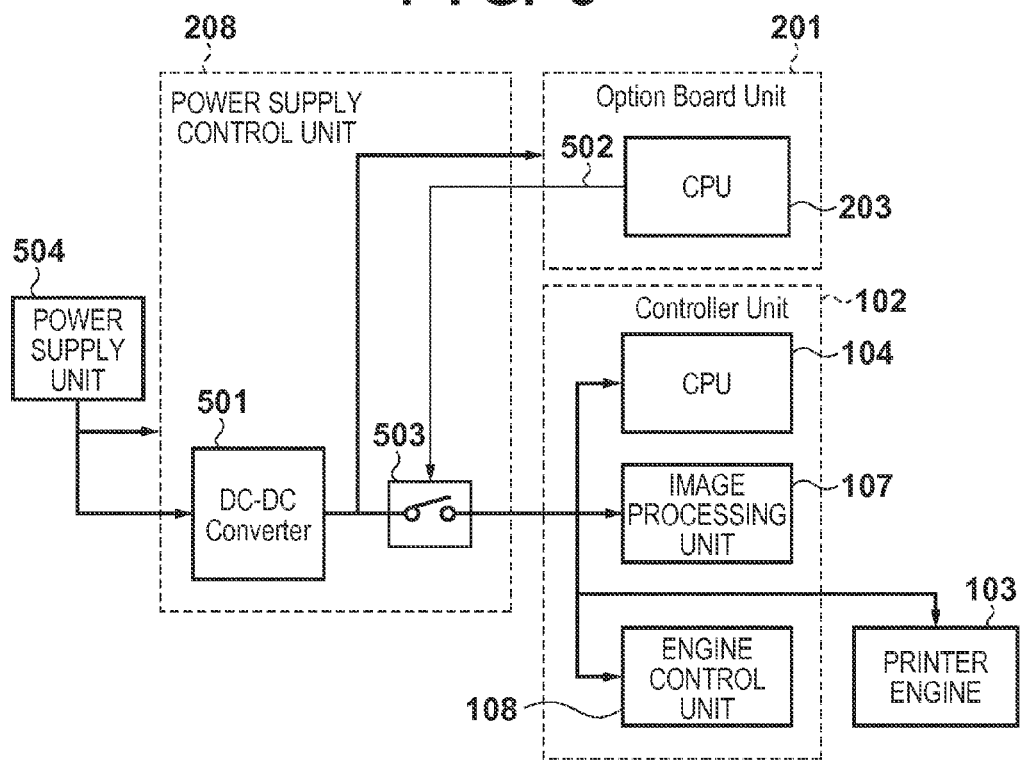
FIG. 3 is a block diagram showing an arrangement for implementing power saving.

A power supply control unit 208 serves as the power supply management unit of the printing apparatus 101, and supplies or stops power to each functional block in the power saving state in accordance with an instruction from the CPU 203. In the embodiment, the power supply control unit 208 receives a GPIO (General Purpose I/O) port signal 502 from the CPU 203, and uses it as a control signal to control the power supply. As shown in FIG. 3, the power supply control unit 208 includes a DC voltage conversion device (DC-DC converter) 501 and switching circuit 503. The power supply control unit 208 switches the switching circuit 503 using the port signal 502 from the CPU 203 as a control signal. In the power saving state, the switching circuit 503 is turned off to stop power supply from a power supply unit 504 to the controller unit 102. The switching circuit 503 is formed from, for example, a contactless switching circuit using an FET transistor and a digital transistor. Even in the power saving state, the power supply control unit 208 always receives power from the power supply unit 504.

In the embodiment, power supply to the units except for the power supply control unit 208 and option board unit 201 stops in the power saving state by power supply control using the port signal 502. Hence, only the minimum functional blocks necessary to implement return to the normal operation state upon receiving job data from the host apparatus 301 and respond to a periodical communication inquiry in the power saving state can operate.

The power supply unit 504 incorporates an AC-to-DC conversion device (AC-DC converter) for converting power used in the printing apparatus 101 from AC power to DC power. The power supply unit 504 generates all powers to be used in the printing apparatus 101. When a condition to shift to the power saving state is satisfied in the normal operation state, the printing apparatus 101 issues an instruction using a port signal from the CPU 203 to the power supply control unit 208 to stop power supply to part of the printing apparatus 101. Similarly, when a condition to return to the normal operation state is satisfied in the power saving state, the printing apparatus 101 issues an instruction using a port signal from the CPU 203 to the power supply control unit 208 to restart power supply.

Figure 4:
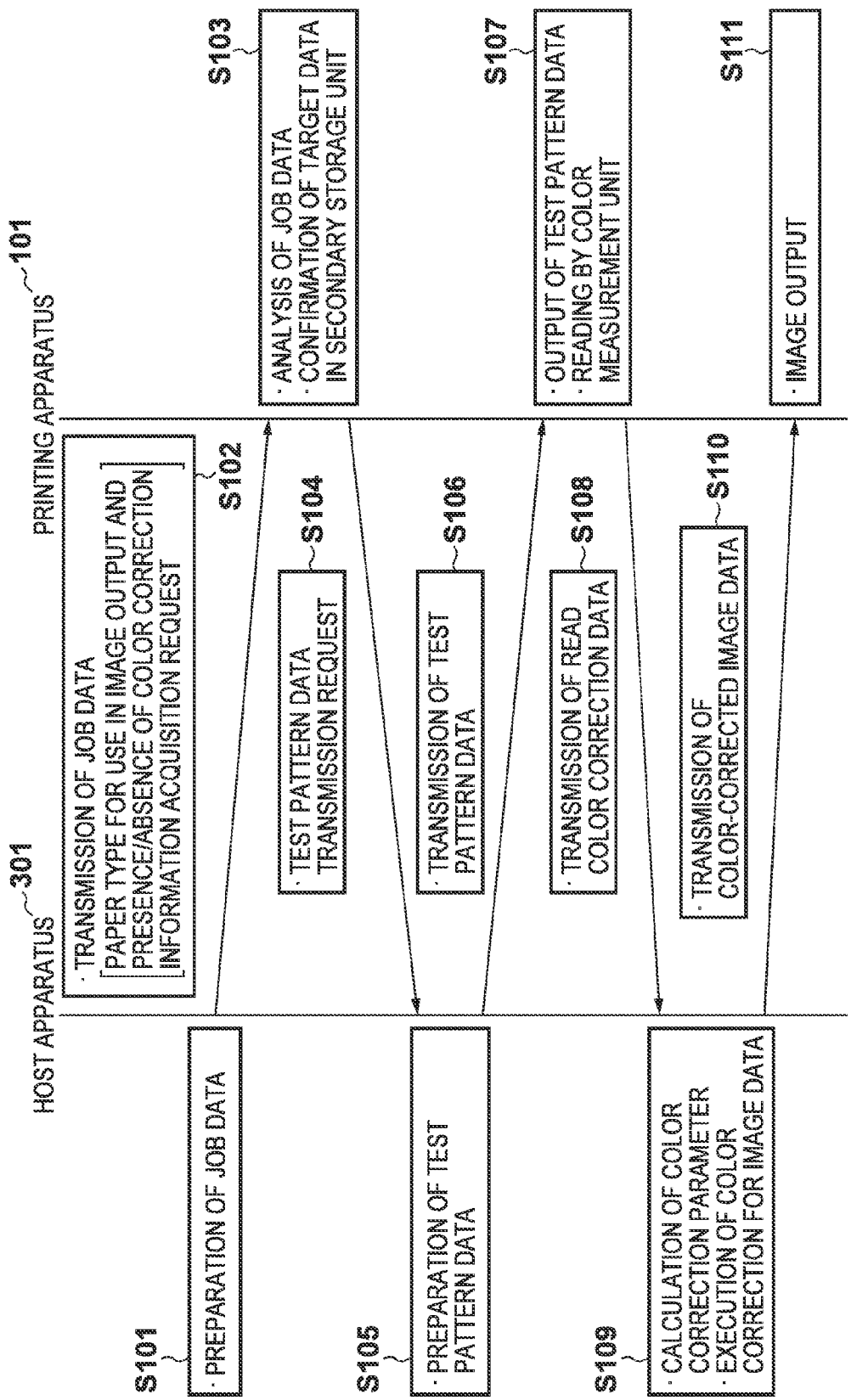
FIG. 4 is a chart showing transmission/reception of data between a host apparatus and the printing apparatus.

A sequence to newly acquire color correction data in accordance with a color correction information acquisition request between the printing apparatus 101 and the host apparatus 301 will be explained with reference to FIG. 4. FIG. 4 is a chart showing a transmission/reception sequence between the printing apparatus 101 and the host apparatus 301. When the user inputs an output instruction via the host apparatus 301 with image output designation which places importance on color reproduction, the host apparatus 301 prepares for data to be transmitted as job data to the printing apparatus 101 (step S101). In the embodiment, designation of whether to place importance on color reproduction is based on the presence/absence of designation in a check box on the driver software. Upon completion of job data preparation, the host apparatus 301 transmits job data to the printing apparatus 101. The job data contains information about a paper type for use in output (printing) and information about the presence/absence of a color correction information acquisition request, which can be identified by the printing apparatus 101 (step S102). Upon receiving the job data, the printing apparatus 101 analyzes the job data, identifies the presence/absence of a color correction information acquisition request, and determines whether the secondary storage unit 113 stores color correction data matching the paper type information contained in the job data. If the printing apparatus 101 determines that the secondary storage unit 113 does not store target color correction data, it issues a test pattern data transmission request to the host apparatus 301 (step S104).

Upon receiving the transmission request from the printing apparatus 101, the host apparatus 301 prepares test pattern data held in the driver software (step S105), and transmits it to the printing apparatus 101 (step S106). The printing apparatus 101 outputs the received test pattern data, reads the output test pattern using the color measurement unit 115 (step S107), and transmits the reading result as color correction data (color measurement data) to the host apparatus 301 (step S108). Upon receiving the color correction data, the host apparatus 301 calculates a color correction parameter from a comparison difference between the color correction data and an ideal value on the driver software. The host apparatus 301 performs color correction processing for image data to be output so that an output color in the printing apparatus 101 coincides with a display color in the host apparatus 301 (step S109). Then, the host apparatus 301 transmits the color-corrected image data to the printing apparatus 101 (step S110). The printing apparatus 101 outputs the received color-corrected image data, and the process ends (step S111).

Figure 5:
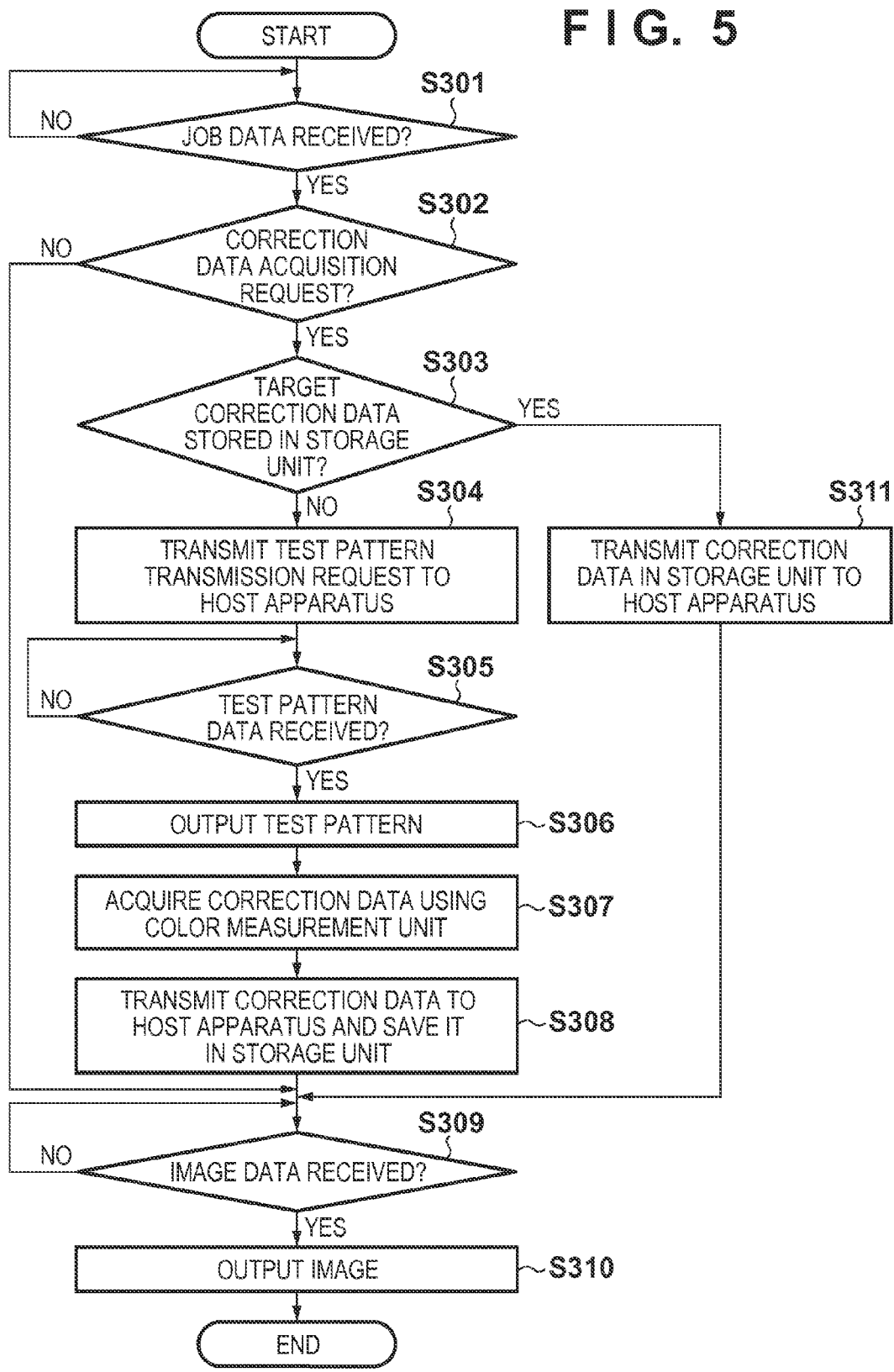
FIG. 5 is a flowchart showing a processing sequence when the printing apparatus receives job data.

A processing sequence when the printing apparatus 101 outputs an image upon receiving job data, and stores color correction data in the normal operation state in the embodiment will be explained with reference to FIG. 5. FIG. 5 is a flowchart showing a processing sequence when the printing apparatus 101 receives job data. In step S301, the printing apparatus 101 receives job data from the host apparatus 301. The CPU 203 analyzes the received job data, and identifies paper type information for use in image output (printing) and the presence/absence of a color correction data acquisition request (step S302). If the job data does not contain a color correction data acquisition request as a result of the identification, the CPU 203 notifies the CPU 104 of reception of the job data and printing designation information containing the paper type information, and starts receiving image data (step S309). Upon completion of buffering and image processing for image data of a line free from any trouble such as a stop during output, image output starts. After the end of outputting all image data, the process ends (step S310). In the embodiment, the job data contains printing designation information such as the type and size of paper for use in printing. Before the start of image output, the CPU 104 confirms whether the printing designation information notified from the CPU 203 matches a paper type and size set by the user via the operation unit 110 of the printing apparatus 101. If the confirmation result is a mismatch, the CPU 104 uses the display of the operation unit 110 to prompt the user to change paper. The CPU 104 waits till the completion of the change without starting image output. However, the CPU 104 keeps receiving image data and stores them in the secondary storage unit 113.

If the job data contains a color correction data acquisition request as a result of the identification in step S302, the CPU 203 notifies the CPU 104 of reception of the job data, and printing designation information containing the color correction data acquisition request and paper type information. Upon receiving the notification, the CPU 104 determines, based on the paper type information, whether the secondary storage unit 113 stores matching color correction data (step S303). In this case, the CPU 104 acquires date & time information from the RTC 111, and compares it with the color correction data acquisition date & time accessory to color correction data stored in the secondary storage unit 113. As for color correction data for which a predetermined storage period has elapsed, the CPU 104 determines a mismatch. This can cope with even a change of the use environment. If the CPU 104 determines in step S303 that the secondary storage unit 113 stores matching color correction data (or a predetermined storage period has not elapsed), it notifies the CPU 203 that color correction data has been stored. The CPU 104 reads out the target color correction data from the secondary storage unit 113, and transmits it to the CPU 203. Upon receiving the target color correction data, the CPU 203 transmits the color correction data to the host apparatus 301 serving as a job data transmission source via the LAN interface 206 and LAN 207 (step S311). Upon receiving the color correction data, the host apparatus 301 calculates a color correction parameter from a comparison difference between the color correction data and an ideal value on the driver software. The host apparatus 301 performs color correction processing for image data to be output so that an output color in the printing apparatus 101 coincides with a display color in the host apparatus 301. Then, the host apparatus 301 transmits the color-corrected image data to the printing apparatus 101. At this time, the printing apparatus 101 waits for reception of image data having undergone color correction processing (step S309). The printing apparatus 101 outputs all image data in the above-described manner, and ends the process (step S310).

If only color correction data for a different paper type or for which a predetermined period has elapsed is stored and no matching color correction data exists in step S303, the CPU 104 instructs the CPU 203 to issue a test pattern transmission request to the host apparatus 301. Upon receiving the transmission request, the CPU 203 issues a test pattern transmission request to the host apparatus 301 via the LAN interface 206 and LAN 207 (step S304). Upon receiving the test pattern transmission request, the host apparatus 301 transmits test pattern data for acquiring color correction data in the apparatus, and waits until the printing apparatus 101 transmits color correction data. The printing apparatus 101 waits until it receives the test pattern data (step S305). Upon receiving the test pattern, the printing apparatus 101 performs image processing by the image processing unit 107, similar to normal image data, and then outputs a test pattern using the printer engine 103 (step S306).

At this time, the test pattern needs to be output using paper of a type matching the designation in the job data. As described above, the CPU 104 confirms whether paper set in the printing apparatus 101 matches a paper type and size set by the user via the operation unit 110. Alternatively, if necessary, the CPU 104 waits till the user changes paper. Upon completion of outputting the test pattern, the CPU 104 reads tint information from the output test pattern using the color measurement unit 115, and acquires color correction data (step S307). Upon completion of acquiring the color correction data, the CPU 104 transmits the color correction data to the host apparatus 301 via the CPU 203. At the same time, the CPU 104 reads the color correction data acquisition time from the RTC 111, and stores the color correction data in the secondary storage unit 113 together with the paper type information used (step S308). After that, as described above, the host apparatus 301 calculates a color correction parameter, performs color correction processing for image data, and transmits the image data to the printing apparatus 101. The printing apparatus 101 completes image output in step S310 after step S309.

Figure 6:
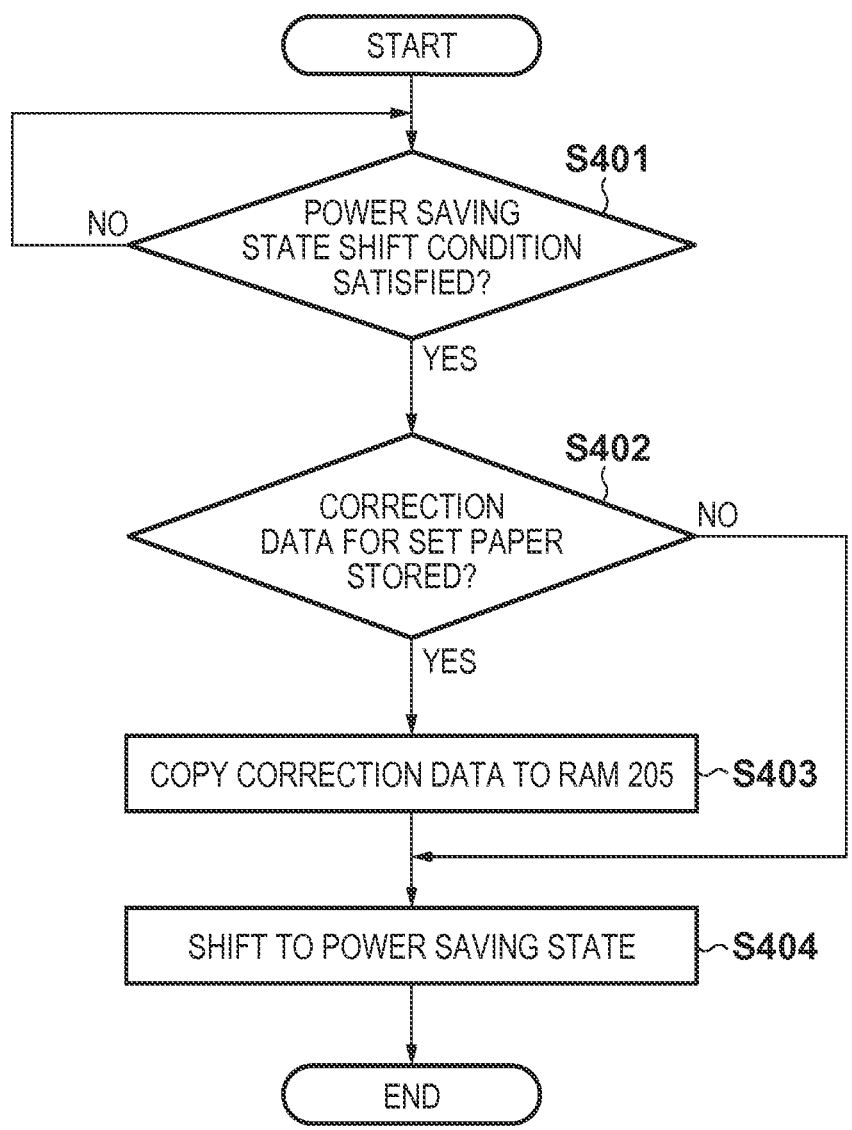
FIG. 6 is a flowchart showing a processing sequence in shift to the power saving state.

A processing sequence when the printing apparatus 101 shifts to the power saving state will be explained with reference to FIG. 6. FIG. 6 is a flowchart showing a processing sequence when the printing apparatus 101 shifts to the power saving state. If a condition to shift to the power saving state is satisfied in step S401, in this case, if the CPU 104 recognizes that there is neither a job data reception notification from the CPU 203 nor a user operation using the operation unit 110 for a predetermined period, the CPU 104 starts shift processing to the power saving state. After the CPU 104 notifies the CPU 203 of shift to the power saving state, it reads information about the type of paper set in the printing apparatus 101 that has been set by the user via the operation unit 110. The CPU 104 determines whether color correction data corresponding to this paper type is stored in the secondary storage unit 113 (step S402). If the CPU 104 determines that the corresponding color correction data is stored, it compares color correction data acquisition date & time information accessory to the color correction data with date & time information acquired from the RTC 111. If the color correction data is data before the lapse of a predetermined period as a result of the determination, the CPU 104 copies the color correction data in the secondary storage unit 113 to the RAM 205 via the CPU 203 together with the paper type information (step S403). At the same time, for a counter program controlled by the CPU 203, the CPU 104 calculates the remaining time till the end of the predetermined period serving the valid period of the color correction data stored in the RAM 205. After status information and the like necessary during the power saving state are stored in the RAM 205, the CPU 104 notifies the CPU 203 of the completion of preparation for shift to the power saving state. Upon receiving the notification, the CPU 203 disconnects the link between the expansion interfaces, switches the switching circuit 503 using the port signal 502, and stops power supply to the controller unit 102, thereby shifting to the power saving state (step S404). The CPU 203 keeps receiving power even in the power saving state. Thus, the CPU 203 can operate independently, and keep driving the above-mentioned counter program to manage the valid period of the color correction data stored in the RAM 205. An area where the color correction data is stored in the RAM 205 is an area used as a buffer area upon receiving image data. After image data is received, the color correction data is overwritten and erased. If the CPU 104 determines in step S402 that no corresponding color correction data exists, the printing apparatus 101 shifts to the power saving state by processing except for processing of copying correction data to the RAM 205 in step S403.

Figure 7:
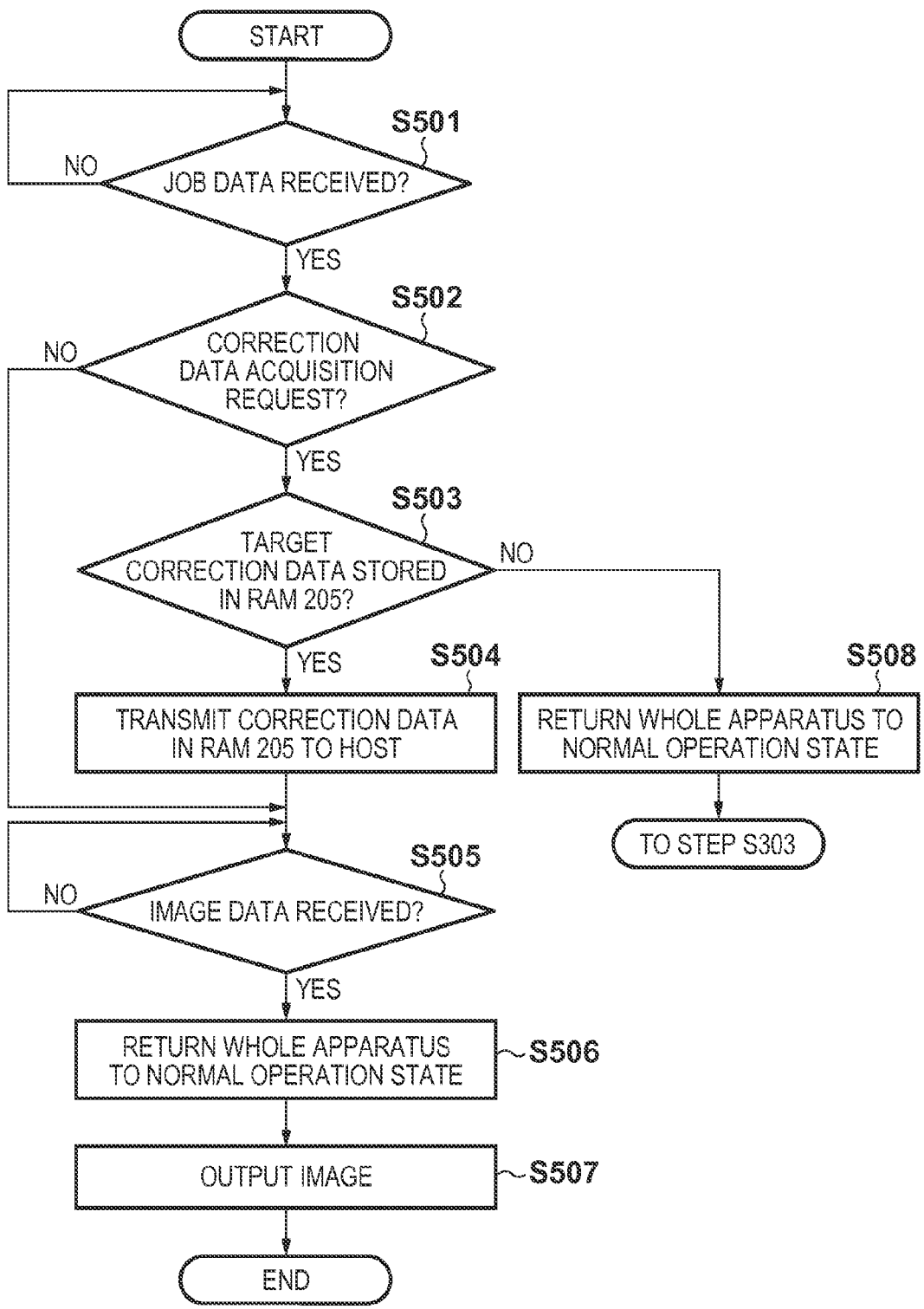
FIG. 7 is a flowchart showing processing when the printing apparatus receives job data in the power saving state.

Processing when the printing apparatus 101 returns from the power saving state to the normal operation state will be explained with reference to FIG. 7. FIG. 7 is a flowchart showing a processing sequence when the printing apparatus 101 receives job data and returns from the power saving state to the normal operation state. If the printing apparatus 101 receives job data from the host apparatus 301 in the power saving state in step S501, the CPU 203 analyzes the received job data, and identifies paper type information for use in image output and the presence/absence of a color correction information acquisition request (step S502). If the job data does not contain a color correction data acquisition request, the CPU 203 waits for reception of image data (step S505). After the start of receiving image data, the CPU 203 switches the switching circuit 503 using the port signal 502 to restart power supply to the controller unit 102. Upon completion of the initialization operation of the controller unit 102, the CPU 203 establishes the link between the expansion interfaces to return the printing apparatus 101 to the normal operation state (step S506). After image output (printing), the process ends (step S507).

If the CPU 203 determines in step S502 that the job data contains a color correction data acquisition request, it refers to color correction data stored in the RAM 205 and determine, based on the paper type information, whether color correction data corresponding to the paper type is stored (step S503). If the valid period of color correction data in the RAM 205 has expired, it is determined that color correction data corresponding to the paper type is not stored. If the CPU 203 determines that no matching color correction data is stored, it returns the whole printing apparatus 101 to the normal operation state by the same procedure as in step S506 (step S508). Thereafter, the CPU 203 performs processes in step S303 and subsequent steps in the normal operation state, and ends image output.

If the CPU 203 determines in step S503 that the matching color correction data is stored in the RAM 205, it reads out the target color correction data from the RAM 205, and transmits it to the host apparatus 301 serving as a job data transmission source (step S504). The printing apparatus 101 then waits for reception of color-corrected image data from the host apparatus 301 (step S505). After the start of receiving image data, the CPU 203 switches the switching circuit 503 using the port signal 502 to restart power supply to the controller unit 102. Upon completion of the initialization operation of the controller unit 102, the CPU 203 establishes the link between the expansion interfaces to return the printing apparatus 101 to the normal operation state (step S506). After that, image output is performed and the process ends (step S507).

By the above-described sequences, when immediately available data exists in response to a color correction data acquisition request in the power saving state, the printing apparatus 101 can respond while maintaining the power saving state.

In the embodiment, the printing apparatus is a color printer adopting the inkjet printing method. However, the present invention is not limited to this, and the printing apparatus may be a printing apparatus adopting another printing method such as a laser beam printer, a copying apparatus, or the like. In the embodiment, the functional block which keeps receiving power even after shift to the power saving state is separated as an option board unit. However, the present invention is not limited to this, and the controller unit may be configured to partially keep receiving power. In the embodiment, the user sets paper type information using the operation unit. However, the present invention is not limited to this, and a paper type may be determined using a sensor or the like. This can improve the reliability of matching with a set paper type. In the embodiment, the RTC 111 is arranged on the controller unit 102 to which power supply stops in the power saving state. However, the present invention is not limited to this, and the RTC 111 may be arranged at a portion where it can directly communicate with the CPU 203 on the option board unit 201. In the arrangement in which the valid period of color correction data stored in the RAM 205 is managed by the counter program controlled by the CPU 203, the predetermined period is directly compared with date & time information of the RTC 111 in shift to the power saving state. This can simplify the arrangement. In the embodiment, target color correction data in the secondary storage unit 113 is copied to the RAM 205. However, the present invention is not limited to this, and the target color correction data may be moved from the secondary storage unit 113. Considering a case in which color correction data moved to the RAM 205 is used again even after return to the normal operation state, the color correction data is written back in the secondary storage unit 113 and is moved to an area in the RAM 205 where the color correction data is neither overwritten nor erased till the completion of write-back.

In the embodiment, the valid period of color correction data stored in the printing apparatus 101 is determined based on the elapsed time in order to cope with a change of the use environment. However, the present invention is not limited to this, and validation/invalidation may be switched in accordance with the change amount using a temperature sensor or humidity sensor. By using a combination of the elapsed time and the change amounts of the temperature sensor and humidity sensor, a change of the use environment may be coped with more strictly.

In the embodiment, after transmitting color correction data from the printing apparatus 101 to the host apparatus 301, data received from the host apparatus 301 is color-corrected output image data. However, the present invention is not limited to this, and a lookup table or the like used in the image processing unit 107 may also be received simultaneously.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-086749, filed Apr. 8, 2011, which is hereby incorporated by reference herein in its entirety.

What is claimed is:

1. A controlling apparatus for controlling an apparatus having a first power mode and a second power mode as an operation mode, the apparatus comprising:
a first controlling unit configured to control power supply so that power is supplied to a first circuit and a second circuit in the first power mode and so that power is not supplied to the first circuit and is supplied to the second circuit in the second power mode,
wherein the first circuit includes a first storage unit for storing correction data and an execution unit for executing a process and wherein the second circuit includes a second storage unit, a receiving unit for receiving a request for acquiring the correction data, and a transmitting unit for transmitting the correction data to an external apparatus, and the second circuit is connected to the first circuit; and
a second controlling unit configured to acquire the correction data from the first storage unit and store the acquired correction data in the second storage unit, prior to transition from the first power mode to the second power mode.

2. The apparatus according to claim 1, wherein, in a case where a transition process from the first power mode to the second power mode is started, the second controlling unit acquires the correction data from the first storage unit and stores the acquired correction data in the second storage unit, and then the first controlling unit stops power supply to the first circuit.

3. The apparatus according to claim 1, further comprising a determining unit configured to, in a case where the receiving unit receives the job data including the request for acquiring the correction data, determine whether the correction data corresponding to the received job data is stored in the second storage unit.

4. The apparatus according to claim 3, wherein the transmitting unit transmits the correction data stored in the second storage unit to the external apparatus in a case where the determining unit determines that the correction data corresponding to the job data received by the receiving unit is stored in the second storage unit in the second power mode.

5. The apparatus according to claim 3, wherein the first controlling unit supplies power to the first circuit and the second circuit, and performs transition from the second power mode to the first power mode in a case where the determining unit determines that the correction data corresponding to the job data received by the receiving unit is not stored in the second storage unit in the second power mode.

6. The apparatus according to claim 3, further comprising a request unit configured to issue, to the external apparatus, a request for transmitting test pattern data for obtaining the correction data to the controlling apparatus in a case where the determining unit determines that the correction data corresponding to the job data received by the receiving unit is not stored in the second storage unit.

7. The apparatus according to claim 6, further comprising a generating unit configured to generate the correction data based on the test pattern data in a case where the receiving unit receives the test pattern data from the external apparatus in response to the request issued by the request unit.

8. The apparatus according to claim 1, further comprising a second determining unit configured to determine whether the correction data corresponding to a predetermined condition is stored in the first storage unit; and
wherein, in a case where the second determining unit determines that the correction data corresponding to the predetermined condition is stored in the first storage unit prior to the transition from the first power mode to the second power mode, the second controlling unit acquires the correction data from the first storage unit and stores the acquired correction data in the second storage unit.

9. The apparatus according to claim 1, wherein the correction data corresponds to a type of a printing medium.

10. The apparatus according to claim 1, wherein the first controlling unit controls power supply in accordance with an instruction from the second circuit.

11. The apparatus according to claim 1, wherein the first storage unit is a secondary storage unit.

12. The apparatus according to claim 1, wherein the second storage unit is a RAM.

13. The apparatus according to claim 1, wherein the correction data is color correction data,
the receiving unit receives image data on which color correction has been performed based on the color correction data, and
the execution unit executes print process of the image data on which color correction has been performed in the first power mode.

14. The apparatus according to claim 1, wherein the apparatus comprises the first circuit and the second circuit.

15. A controlling method for controlling an apparatus having a first power mode and a second power mode as an operation mode, the method comprising:
performing power supply so that power is supplied to a first circuit and a second circuit in the first power mode, wherein the first circuit includes a first storage unit for storing correction data and an execution unit for executing a process and wherein the second circuit includes a second storage unit, a receiving unit for receiving a request for acquiring the correction data, and a transmitting unit for transmitting the correction data to an external apparatus, and the second circuit is connected to the first circuit;
performing power supply so that power is not supplied to the first circuit and is supplied to the second circuit in the second power mode; and
acquiring the correction data from the first storage unit and storing the acquired correction data in the second storage unit, prior to transition from the first power mode to the second power mode.

16. A non-transitory computer-readable medium storing a program for causing a computer to execute a method defined in claim 15.

* * * * *